Dec. 30, 1958   J. W. BLACK   2,866,672
BEARING STRUCTURE
Filed Nov. 1, 1956

INVENTOR.
JOHN W. BLACK
BY
Woodhams, Blanchard & Flynn
ATTORNEYS

United States Patent Office 2,866,672
Patented Dec. 30, 1958

2,866,672

BEARING STRUCTURE

John W. Black, Kalamazoo Township, Kalamazoo County, Mich., assignor to Pemco Wheel Company, Kalamazoo, Mich., a corporation of Michigan Application November 1, 1956, Serial No. 619,839

10 Claims. (Cl. 308—191)

This invention relates to bearing assemblies and, particularly, to a type thereof for supporting a shaft co-axially and rotatably with respect to a surrounding housing.

Although a variety of ball bearings and ball bearing assemblies have been devised in the past for meeting a practically limitless number of different situations, a constant effort is being made to improve the effectiveness of such bearings while simultaneously lowering their cost. This is of particular importance in the manufacture of bearings of small sizes, which are manufactured in large numbers for a variety of different purposes, such as bearings used in caster wheels, conveyor wheels, small truck wheels and in other uses of generally similar nature. Where the production of such bearing assemblies is on the order of several hundred or more per hour, it is apparent that even a small reduction in the unit cost of a bearing assembly will result in great savings, both to the manufacturer of the bearing assemblies and to the users thereof. On the other hand, in view of the critical part played by such bearing assemblies in practically all of their usual locations of use, it is equally apparent that such cost reductions, if any, must be made without sacrificing quality.

Accordingly, a principal object of the invention is to provide a bearing assembly for supporting a spindle co-axially within, and rotatably mounted with respect to, a surrounding cylindrical housing.

A further object of the invention is to provide a bearing structure, as aforesaid, which will be particularly adaptable for supporting wheels of the caster or similar type on, and for rotation with respect to, a shaft or spindle.

A further object of the invention is to provide a bearing structure, as aforesaid, having at least two groups of bearings arranged around the shaft, said groups being spaced axially of said shaft from each other.

A further object of the invention is to provide a bearing structure, as aforesaid, of sufficient structural simplicity that it can be assembled rapidly and inexpensively.

A further object of the invention is to provide a bearing structure, as aforesaid, which will be strong and rugged, and which will be capable of long and reliable use under severe operating conditions.

A further object of the invention is to provide a bearing structure, as aforesaid, in which the parts on, and against, which the bearing balls run and which, therefore, require a wear-resistant surface, constitute a sufficiently small part of the total assembly as to minimize the cost at this point.

A further object of the invention is to provide a bearing structure, as aforesaid, in which portions of the surrounding houses are displaced radially inwardly and constitute means by which adjacent bearing groups are held axially separated from each other.

A further object of the invention is to provide a bearing structure, as aforesaid, comprised of a minimum number of parts, each part being of such structural simplicity that it is capable of being manufactured at a minimum cost.

A further object of the invention is to provide a bearing structure, as aforesaid, in which the bearing can be constructed in a variety of sizes and for a variety of specific uses, with a minimum of modification of design and structural requirements.

Other objects and purposes of the invention will be apparent to persons acquainted with devices of this general type upon reading the following specification and inspecting the accompanying drawings.

*In general*

This invention, in general, provides a generally cylindrical housing for surrounding and containing the bearing assembly. The bearing spindle, which may be either hollow or solid, as required by the particular use to which the bearing is to be put, is poistioned co-axially within the housing. At least two bearing races are supported within the housing and poistioned back-to-back with respect to each other and in contact with the radially inwardly displaced portions of said housing. Thus, said displaced portions of the housing serve to limit the axial movement of said races toward each other. A bearing cone is placed on, and for rotation with, each end of the spindle and is arranged in cooperative relationship with one of the bearing races. Suitable bearing balls are positioned between the cones and races in the usual manner. A shoulder on the spindle limits the movement of the cones axially inwardly, and suitable upset portions on the spindle limit the movement of the cones axially outwardly.

In the description which follows, certain reference terms will be used for convenience in description, but these reference terms will have no limiting significance unless the context expressly indicates otherwise. Particularly, the terms "radially inward," "radially outward," or derivatives thereof, will indicate directions radially toward, or radially away from, respectively, the axis of the spindle on which the bearing assembly is mounted. The terms "axially inward," "axially outward," or derivatives thereof, will indicate directions toward, or away from, respectively, the geometric center of the bearing assembly and in a direction parallel with said axis.

*Detailed description*

Figure 1:
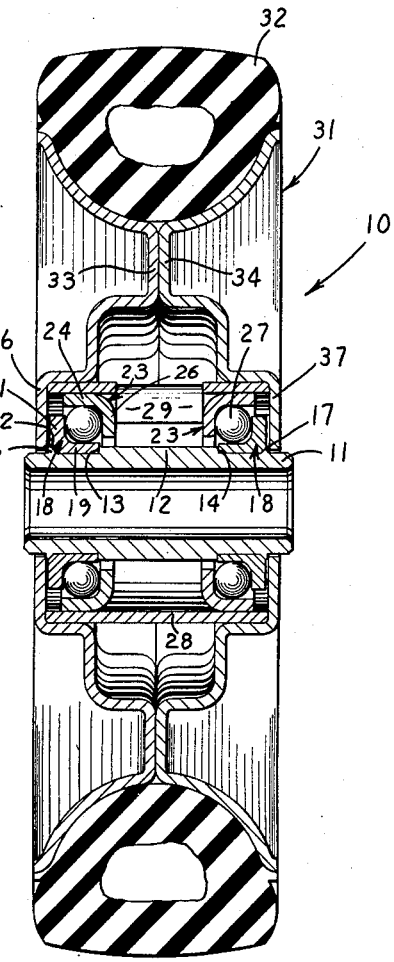
Figure 1 is a central, sectional view of the bearing construction, herein shown in association with a small truck wheel.
Figure 2:
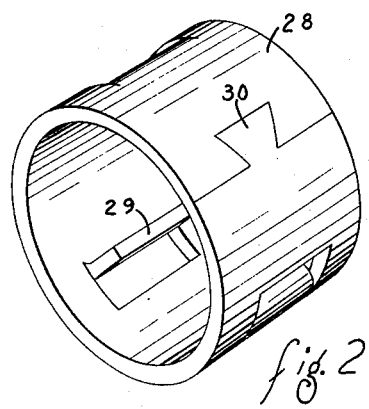
Figure 2 is an oblique view of the bearing assembly housing.

Referring to Figure 1, there is shown a bearing assembly 10, which includes a spindle 11, herein shown as being substantially cylindrical. The spindle 11 has an externally enlarged, central portion 12 defining a pair of longitudinally spaced shoulders 13 and 14. During the assembly operation, as hereinafter described, a pair of retaining ridges 16 and 17 are formed on the spindle 11 adjacent the axial ends thereof.

A pair of annular retaining cones 18 are positioned about the spindle 11, one of said cones being on either side of the enlarged central portion 12. Each cone 18 includes a cylindrical portion 19, which extends axially inwardly along the spindle 11 and abuts at its inner end against the respective shoulders 13 and 14, and a flange 21 at its axially outer end, which extends radially away from the spindle 11. Each cone 18 is also provided with an annular shoulder 22 at the juncture of the portion 19 and the flange 21 adjacent the spindle 11, which shoulders bear against respective ones of the ridges 16 and 17 for holding said cones 18 on said spindle.

An annular bearing race 23 is associated with each of the cones 18. Each race 23 includes a cylindrical portion 24 extending axially outwardly of the spindle 11. The cylindrical portion 24 is spaced radially outwardly from, and is opposed to, the cylindrical portion 19 of the cones 18. A radially extending flange 26 is provided on each of the races 23, said flange extending toward, but being spaced from, the spindle 11 and being opposed to the flange 21 of the cones 18. The races 23 and the retaining cones 18 define a pair of zones, each of which receives a set of bearing balls 27.

A substantially cylindrical housing 28 surrounds and retains the bearing races 23. A plurality, herein shown as three, of radially inwardly projecting bars 29 on the housing 28 project between the adjacent races 23 and bear against the radially extending flanges 26 thereof. The housing 28 is preferably formed of sheet stock by first punching out the bars 29 and then bending the sheet to a cylindrical form and locking same in such condition in any convenient manner, such as by a dovetail 30, followed by brazing, if desired. It is apparent that the housing 28 could be formed of tube stock, if desired, although this would somewhat complicate the punching-out of the bars 29. Further, it is apparent that the bars could have a variety of shapes and that the housing could be formed by casting and machining to the desired shape.

The housing 28 provides a support for the structure to be mounted on the spindle 11. For the purpose of illustration, there is shown a wheel structure 31 supported on the housing 28. The wheel structure 31 includes a tire 32 and a pair of hub plates 33 and 34, which latter are secured together and to said housing 28. The hub plates 33 and 34 have radially inwardly extending flanges 36 and 37, respectively, extending toward the spindle 11 and enclosing the housing 28 and the bearing structures. It is apparent that a variety of different structures could be mounted in this manner.

In assembly, the spindle 11 and the housing 28 are held in predetermined, co-axial relationship by a suitable fixture. One of the bearing races 23, such as the leftward one showing in Figure 1, is positioned within the housing 28, against one end of the bars 29. A set of bearing balls 27 is then positioned in the race 23 and a cone 18 is placed over the balls and abutting against the shoulder 13, said shoulder and the bars 29 serving to properly space the race and the cone. The end of the spindle 11 is then upset to provide a ridge, such as the ridge 16, to lock the cone 18 in position. The spindle is then inverted and the second bearing structure, including a race, a set of bearing balls and a cone, is assembled thereon in the same manner, and the ridge 17 formed to lock the whole assembly together. The ridge 17, as well as the ridge 16, may be formed in any convenient manner and may even include a piece applied to the spindle in the manner of a collar. However, in the particular embodiment here shown for illustrative purposes, the ridge is provided by upsetting the radially external portion of the spindle in a well known manner.

The spindle itself may be the primary support for the structure mounted thereon or it, in turn, may be keyed to a solid shaft. Further, the spindle itself may be solid, rather than tubular, if desired.

It will be recognized that either or both of the cones and/or bearing races may be heat-hardened, or otherwise provided with a wear-resistant surface, without similarly treating any other parts, particularly the spindle and the housing, of the assembly. Inasmuch as the cones and races are relatively small parts, it will be recognized that these parts may be hardened in order to make the bearing assembly highly wear-resistant, without materially increasing the total cost over that of a bearing assembly which is not wear-resistant. For the same reason, this bearing assembly can be fabricated with less expense than a bearing assembly which requires hardening of the spindle or housing, or both.

Although a particular, preferred embodiment of the invention is herein shown for illustrative purposes, it will be recognized that variations or modifications thereof, which lie within the scope of such disclosure, are fully contemplated unless specifically stated to the contrary in the hereinafter appended claims.

I claim:

1. A bearing structure, comprising in combination: a spindle, said spindle having means providing a pair of longitudinally spaced shoulders on the external surface thereof; a housing having a cylindrical, internal opening surrounding, and spaced from, said spindle, said housing having a plurality of radially inwardly extending bars on its inner surface; a pair of bearing races, each of said races including a radially inwardly extending flange abutting against the respective ends of said bars and including a cylindrical portion extending longitudinally toward the ends of, and spaced from, said spindle and being in contact with said housing; a pair of retaining cones, each of said cones including a radially outwardly extending flange and a cylindrical portion surrounding said spindle and abutting against one of said shoulders, each of said radially outwardly extending flanges being spaced axially outwardly from the respectively adjacent, inwardly extending flanges of said races; a pair of ridges on said spindle, each ridge engaging the outer end of one of said respective retaining cones for securing same to said spindle; and a set of bearing balls disposed between each race and its associated retaining cone.

2. The device defined in claim 1, wherein the cylindrical portions of said cones bear against said shoulders at the ends of said cones remote from the flanges thereon and said cylindrical portions of said cones are radially inwardly from the cylindrical portions of said bearing races.

3. The device defined in claim 1, wherein said housing is a tubular sleeve.

4. The device defined in claim 1, wherein said ridges are integral and displaced portions of said spindle.

5. The device defined in claim 1, wherein said inwardly extending elements are portions of said housing which have been displaced radially inwardly.

6. The process of assembling a bearing structure for supporting a member, having a central opening, in rotatable relationship on a spindle, the steps comprising: providing a substantially rectangular piece of material, having a width equal to the length of the desired bearing structure and a length equal to the length of the inner surface of said opening, and displacing at least one portion thereof externally therefrom, said portion being spaced from both sides and both ends of said piece; bending said piece to form a housing, having external size and shape conforming to the internal surface of said opening, and having said displaced portion extending radially inwardly, and fastening the adjacent ends of said housing firmly together; placing a spindle within, and co-axial with, said housing; inserting a bearing race through one end of said housing and against one end of said displaced portion, with the cylindrical portion of said race extending axially outwardly; inserting a group of bearing balls around said spindle, against said race within said cylindrical portion; inserting a cone around said spindle into operative position with respect to said balls and said race, and upsetting a portion of said spindle to provide a ridge for holding said race in predetermined location with respect to said spindle; inverting said parts and applying a second race within said housing, against the other end of said displaced portion, inserting a second group of bearing balls around said spindle and against said race, and applying a second cone onto said spindle and locating it in operative position with respect to said second group of balls and said second race; and upsetting a portion of the second end of said spindle adjacent said second cone for holding the entirety of said assembly together.

7. A bearing structure, comprising in combination: a spindle having a pair of axially spaced, outwardly extending shoulders thereon; a housing having a cylindrical internal opening surrounding, and spaced from, said spindle, said housing having spacing means extending inwardly from its inner surface; a pair of annular bearing races positioned, respectively, at the respective longitudinal ends of said spacing means, said races each including an inwardly extending flange abutting against one end of said spacing means and including a cylindrical portion extending axially away from said spacing means toward one axial end of said spindle, said cylindrical portion extending along and being secured to the interior surface of said housing; a pair of retaining cones, each of said cones being associated with one of said races and including an outwardly extending flange and a cylindrical portion surrounding said spindle and abutting against one of said shoulders, the flange on each cone being spaced axially from the flange on the race associated therewith; means on said spindle engaging the outer ends of said retaining cones for securing same to said spindle; and a set of bearing balls positioned between each race and its associated retaining cone.

8. A wheel structure, comprising in combination: a spindle having a pair of axially spaced, outwardly extending shoulders thereon; a cylindrical housing surrounding, and spaced from, said spindle, said housing having spacing means extending inwardly from its inner surface; a pair of bearing races positioned at either axial end of said spacing means, each said race including a radially inwardly extending flange abutting against one end of said spacing means and including a cylindrical portion extending axially away from said spacing means toward one axial end of said spindle, said cylindrical portion extending along and being secured to the interior surface of said housing; a pair of retaining cones; each of said cones being associated with one of said races and including a radially outwardly extending flange and a cylindrical portion surrounding said spindle and abutting against one of said shoulders, said flange on each said cone being spaced axially outwardly from the flange on the race associated therewith; means on said spindle engaging the outer ends of said retaining cones for securing same to said spindle; a set of bearing balls disposed between each race and its associated retaining cone; a wheel surrounding said spindle, said wheel including a pair of hub plates, said hub plates each having outer flat portions joined to each other and extending radially with respect to said spindle, said plates having radially inner cylindrical portions extending axially with respect to said spindle, said cylindrical portions of said plates surrounding and being secured to said housing.

9. A wheel structure, comprising in combination: a pair of similarly shaped annular hub plates, each of said plates having a radially outer rim; a flat portion extending radially inwardly and a radially inner cylindrical wall, said flat portions being joined together to form an integral assembly having an axially extending central opening; a cylindrical housing positioned within said central opening coaxial with said cylindrical walls and with the outer surface thereof being adjacent and secured to the inner surface of said cylindrical walls, said housing having spacing means extending inwardly from its inner surface intermediate the ends thereof; a spindle extending coaxially through said housing and having a pair of axially spaced outwardly extending shoulders thereon; a bearing unit positioned around said spindle at either end of said spacing means, each of said bearing units including a race abutting against one end of said spacing means and secured to said housing and a retaining cone abutting against one of said shoulders; means at either axial end of said spindle for securing said cones to said spindle; and a set of bearing balls disposed between each race and its associated retaining cone.

10. A wheel structure according to claim 9 wherein each race includes a radially inwardly extending flange abutting against one end of said spacing means and including a cylindrical portion extending axially away from said spacing means toward one axial end of said spindle, said cylindrical portion contacting and extending along the interior of said housing; each of said cones including a radially outwardly extending flange and a cylindrical portion surrounding said spindle and abutting against one of said shoulders; each of said hub plates having a skirt extending radially inwardly from the outer axial end of said cylindrical wall.

References Cited in the file of this patent

UNITED STATES PATENTS

| | | |
|---|---|---|
| 1,451,248 | Winter | Apr. 10, 1923 |
| 2,148,658 | Stiffler | Feb. 28, 1939 |
| 2,596,771 | Harbour | May 13, 1952 |
| 2,643,917 | Douglas et al. | June 30, 1953 |